United States Patent
Kunimi et al.

[11] Patent Number: 5,987,988
[45] Date of Patent: Nov. 23, 1999

[54] ACCELERATION SENSOR AND METHOD FOR MANUFACTURING THEREOF

[75] Inventors: Takashi Kunimi, Tokyo; Masahiro Nezu; Masatomo Mori, both of Saitama; Tadao Matsunaga, Miyagi, all of Japan

[73] Assignee: Akebono Brake Industry Co., Ltd., Tokyo, Japan

[21] Appl. No.: 08/905,724

[22] Filed: Aug. 4, 1997

[30] Foreign Application Priority Data

Aug. 5, 1996 [JP] Japan ................................. 8-205891

[51] Int. Cl.⁶ ........................................................ G01P 15/00
[52] U.S. Cl. ............................ 073/514.01; 200/61.45 R
[58] Field of Search ................................. 73/1.37, 1.38, 73/514.01, 514.35, 488; 200/61.45 R, 61.52; 438/639, 635, 647, 696, 701, 702

[56] References Cited

U.S. PATENT DOCUMENTS

| | | | |
|---|---|---|---|
| 3,733,447 | 5/1973 | Schneider, Jr. | 200/61.52 |
| 4,001,185 | 1/1977 | Mitsui et al. | 200/61.45 R |
| 4,031,848 | 6/1977 | Killen | 73/514.01 |
| 4,135,067 | 1/1979 | Bitko | 200/61.52 |
| 4,337,402 | 6/1982 | Nowakowski | 307/121 |
| 4,927,783 | 5/1990 | Arai et al. | 437/196 |
| 4,977,105 | 12/1990 | Okamoto et al. | 437/190 |
| 5,410,113 | 4/1995 | Mielke | 200/61.45 R |

FOREIGN PATENT DOCUMENTS

| | | |
|---|---|---|
| 4-127574 | 11/1992 | Japan . |
| 4-136575 | 12/1992 | Japan . |

*Primary Examiner*—Hezron Williams
*Assistant Examiner*—Richard A. Moller
*Attorney, Agent, or Firm*—Morgan, Lewis & Bockius LLP

[57] ABSTRACT

An acceleration sensor includes a first substrate, a second substrate and a third substrate. The second substrate has a through-hole, a first contact formed on an inner surface of the through-hole, and a first bonding pad connected to the first contact. An electrically conductive ball is accommodated in the through-hole. The third substrate has a recess, a second contact formed in the recess contacting the bottom of the electrically conductive ball, and a second bonding pad connected to the second contact.

18 Claims, 4 Drawing Sheets

$Fg = m \cdot g$ $Fa = m \cdot a$ $Fg = m \cdot g$

ACCELERATION SENSOR AND METHOD FOR MANUFACTURING THEREOF

This application claims the benefit of Application No. Hei. 8-205891, filed in Japan on Aug. 5, 1996, which is hereby incorporated by reference.

BACKGROUND OF THE INVENTION

1. Field of the Invention

This invention relates to an acceleration sensor with a switch and more particularly to a highly sensitive acceleration sensor to detect acceleration in an X–Y plane.

2. Discussion of the Prior Art

In some conventional acceleration sensor as disclosed, for example, in Japanese Utility Patent Application (OPI) Nos. 127574/1992 and 136575/1992, two contacts are connected with a conductive ball which is displaced by acceleration. However, the conventional mechanical acceleration sensor of this type is rather large in size. Therefore, such conventional acceleration sensor has slow response and low accuracy. In addition, the mass production of the mechanical acceleration sensor is difficult, and therefore conventional sensor has a high manufacturing cost.

SUMMARY OF THE INVENTION

Accordingly, the present invention is directed to an acceleration sensor and method for manufacturing thereof that substantially obviates one or more of the problems due to limitations and disadvantages of the related art.

An object of the present invention is to provide an acceleration sensor with a mechanical switch having quick response and high accuracy.

Another object of the present invention is to provide a method of manufacturing an acceleration sensor with small size, high accuracy, and low manufacturing cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the acceleration sensor comprises a first substrate; a second substrate having a through-hole, a first contact formed on an inner surface of the through-hole, and a first bonding pad connected to the first contact; an electrically conductive ball accommodated in the through-hole; a third substrate having a recess, a second contact formed in the recess for contacting the bottom of the electrically conductive ball, and a second bonding pad connected to the second contact.

In another aspect, the method for manufacturing an acceleration sensor comprises the steps of forming a first substrate; forming a through-hole in a second substrate; vacuum-evaporating an electrically conductive metal or diffusing high density impurities to form a first contact on the inner surface of the through-hole and a first bonding pad on an upper end face of the second substrate which is connected to the first contact; etching a third substrate to form a recess; vacuum-evaporating an electrically conductive metal or diffusing high density impurities to form a second contact on the recess and the outer peripheral edge of the recess and to form a second bonding pad connected to the second contact; welding one of the first and third substrates to one end face of the second substrate; accommodating an electrically conductive ball in the through-hole, a portion of the second contact being in contact with a bottom of the electrically conductive ball accommodated in the through-hole; and welding the other one of the first and second substrates to the other end face of the second substrate.

In another aspect, the acceleration sensor includes a first substrate; a second substrate having a through-hole, a first contact formed on the inner cylindrical surface of the through-hole, and a first bonding pad connected to the first contact; an electrically conductive ball accommodated in the through-hole; a third substrate having a recess, a second contact formed in the recess a part of which is in contact with the bottom of the electrically conductive ball, and a second bonding pad connected to the second contact. Here, the through-hole may be circular or square in section and the recess may be substantially U-shaped V-shaped in section (being substantially conical).

In another aspect, the acceleration sensor manufacturing method including a step of forming a first substrate; a step of forming a through-hole in a second substrate; a step of vacuum-evaporating an electrically conductive metal or diffusing high density impurities, to form a first contact on the inner cylindrical surface of the through-hole and a first bonding pad on the upper end face of the second substrate which is connected to the first contact; a step of etching a third substrate to form a recess a part of which is in contact with the bottom of the electrically conductive ball accommodated in the through-hole; a step of vacuum-evaporating an electrically conductive metal or diffusing high density impurities to form a second contact on the recess and the outer peripheral edge of the recess which is in contact with the electrically conductive ball, and a second bonding pad connected to the second contact; a step of welding one of the first and third substrates to one end face of the second substrate, and accommodating the electrically conductive ball in the through-hole, and then welding the other substrate to the other end face of the second substrate.

It is to be understood that both the foregoing general description and the following detailed description are exemplary and explanatory and are intended to provide further explanation of the invention.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
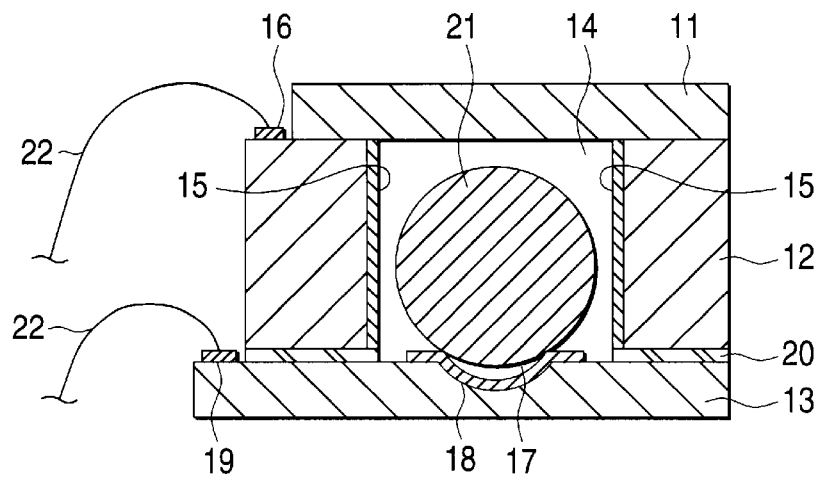
FIG. 1 is a sectional view outlining the structure of an acceleration sensor, according to a first embodiment of the present invention.
Figure 2:
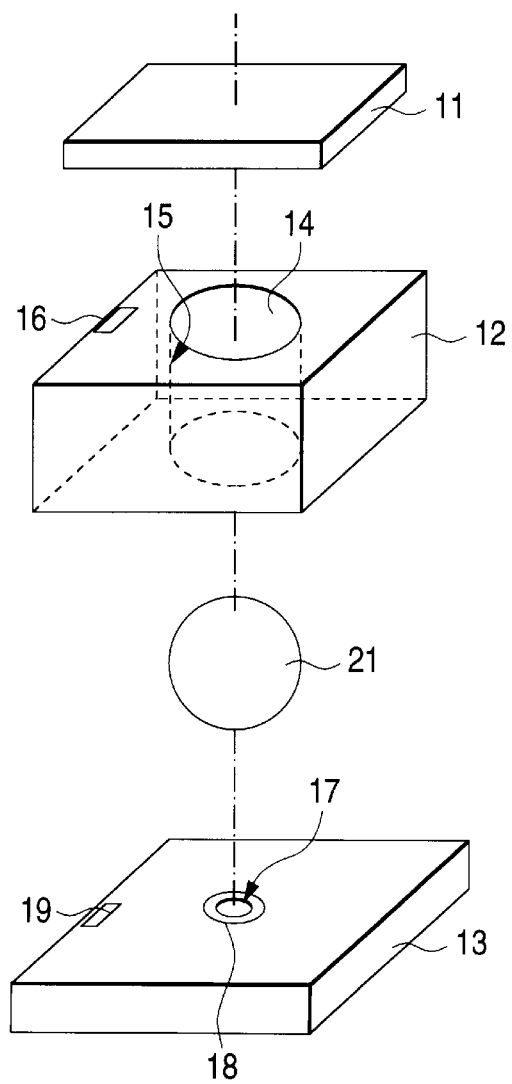
FIG. 2 is an exploded perspective view of the acceleration sensor of FIG. 1.

FIG. 1 is a sectional view illustrating the structure of an acceleration sensor according to a first embodiment of the present invention, and FIG. 2 is an exploded perspective view of the acceleration sensor.

As shown in FIGS. 1 and 2, the acceleration sensor according to the present invention comprises a body with at least three layers formed from a first substrate 11, a second substrate 12, and a third substrate 13. The acceleration sensor further comprises an electrically conductive ball 21. The second substrate defines a through-hole 14 and the third substrate defines a recess 17. Here, the though-hole 14 is preferably larger than the electrically conductive ball 21. Accordingly, the electrically conductive ball 21 may be accommodated in the through-hole 14 to be disposed on the recess 17.

A first contact 15 is provided on the inner cylindrical surface of the through-hole 14, and a first bonding pad 16 is connected to the first contact 15. A second contact 18 is provided in the recess 17, with at least a portion of the second contact 18 contacting the bottom of the electrically conductive ball 21, and second bonding pad 19 is connected to the second contact 18. Here, the through-hole 14 may be of any shape, for instance, circular or square in horizontal cross-section. In addition, the vertical cross-section of the recess 17 may be of any desired shape, such as substantially U-shaped or V-shaped in section.

In accordance with the present invention, when acceleration is applied to the acceleration sensor, the electrically conductive ball 21 moves relative to the body of the acceleration sensor according to the inertial force so that it contacts the first contact 15. That is, the first and second contacts 15 and 18 are electrically connected with each other through the conductive ball 21. Thereupon, the connection signal is transmitted outside through the bonding pads 16 and 19.

The fabrication of the acceleration sensor according to the present invention will now be described.

The first substrate 11 may be formed from a glass or silicon substrate which is subjected to glass sputtering. Dimension of a preferable exemplary first substrate is 5mm× 5mm. The second substrate 12 may be a silicon substrate. Here, a cylindrical through-hole 14 if formed through the center, for instance, by etching. Aluminum or gold is vacuum-deposited on the inner cylindrical surface of the through-hole 14 to form a first contact 15. Alternatively, first contact 15 may be formed by diffusing high density impurities. Glass film 4 μm thick is formed on the lower surface of the second substrate 12, for instance, by sputtering to weld it with the third substrate 13.

With the aid of a wiring pattern (not shown), the first contact 15 is connected to a first bonding pad 16 which is formed on the upper end face of the second substrate 12, for instance by vacuum depositing an electrically conductive material such as aluminum or gold. This technique is similar to that used to form a wiring pattern on a semiconductor substrate.

The third substrate 13 may be formed from a silicon substrate. A recess 17 is formed at the center of the third substrate 13, for instance, by isotropic etching. Preferably, the size of the recess 17 is slightly smaller than an electrically conductive ball 21. The recess 17 and a portion around the recess 17 (i.e., a peripheral edge portion) are formed into a second contact 18 by vacuum-depositing aluminum or gold or by diffusing high density impurities. Here, a portion of the second contact is formed to be in contact with the conductive ball.

In a manner similar to the first contact 15, the second contact 18 is connected to the second bonding pad 19 formed on the upper end face of the third substrate 13. That is, the second contact 18 is connected through a wiring pattern (not shown) to a second bonding pad 19 which is formed on the upper end face of the third substrate 13.

The conductive ball 21 is preferably a steel ball 1 mm in diameter with a gold-plated surface so that it may efficiently electrically connect with the first contact 15 and the second contact 18.

As discussed above, a sputter glass film, or a glass film with a low melting point is provided between the second substrate 12 and the third substrate 13 for joining them together, for instance, by anode welding. Alternatively, the substrates may be joined together using an adhesive agent, or may be welded together by heating.

After the conductive ball 21 is inserted in the through-hole 14, the first substrate 11 is placed on the second substrate 12, and welded together in the above-described manner. When the through-hole 14 is closed with the first substrate 11, the through-hole 14 is made vacuous or filled with inactive gas, such as nitrogen.

Then, lead-outs, such as bonding wires 22, are connected to the first and second bonding pads 16 and 19.

In addition, in the above-described embodiment, the semiconductor is processed by etching or impurity diffusion. However, any conventional semiconductor wafer process may be employed. Hence, the acceleration sensor can be mass-produced to achieve a high accuracy product with low manufacturing cost.

Figure 3:
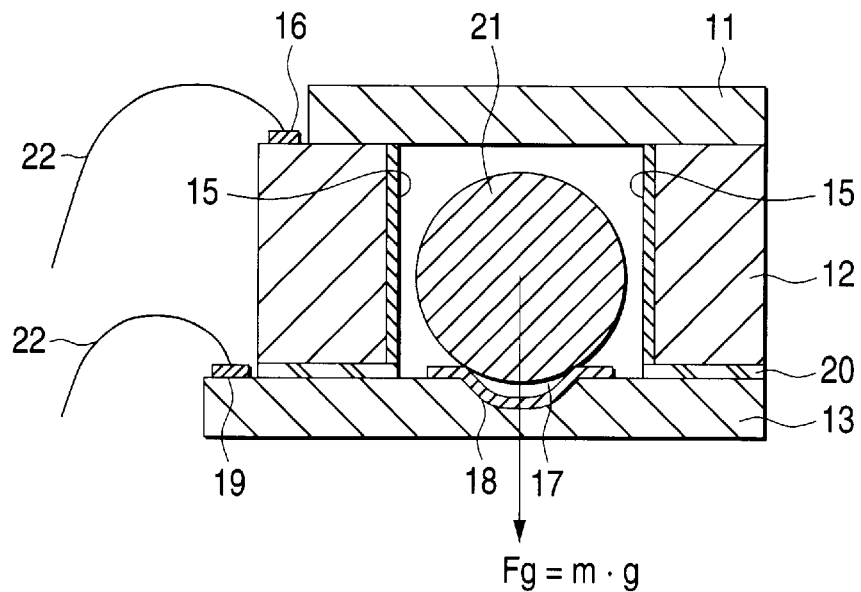
FIG. 3 is a diagram illustrating a state of the acceleration sensor when no acceleration is applied.
Figure 4:
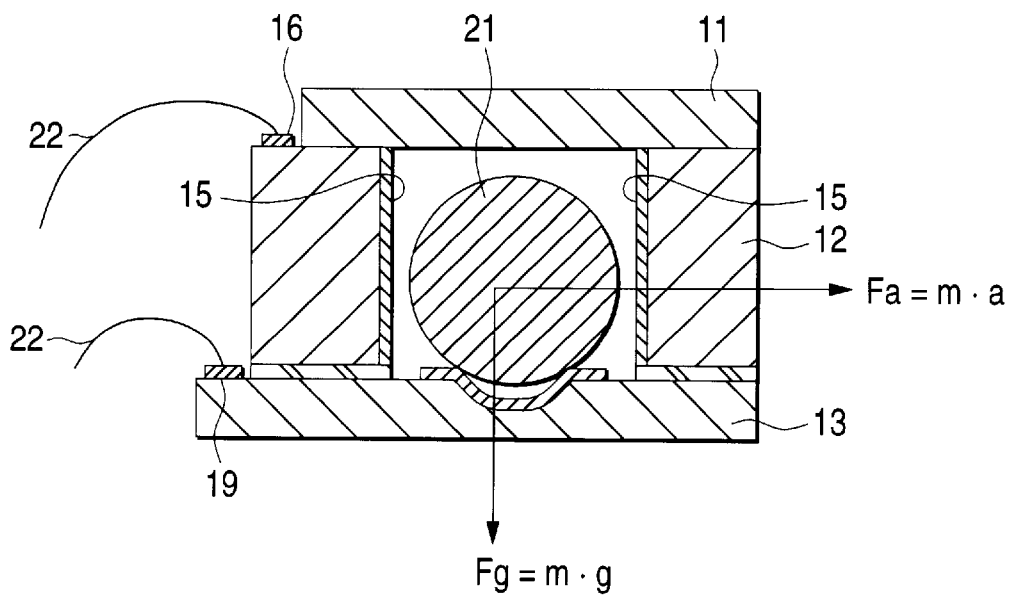
FIG. 4 is a diagram illustrating a state of the acceleration sensor when acceleration is applied.
Figure 5:
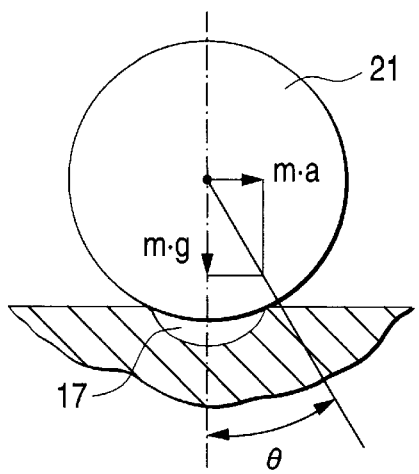
FIG. 5 is a diagram illustrating the relationship between an electrically conductive ball and a recess in the acceleration sensor of FIG. 1.
Figure 6:
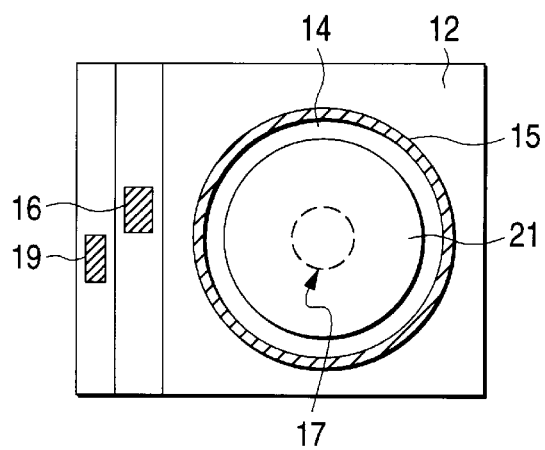
FIG. 6 is a top view of the acceleration sensor of FIG. 1.

The operation of the acceleration sensor according to the present invention will now be described in accordance with FIGS. 3 through 5. FIG. 3 is a diagram showing a state of the acceleration sensor when no acceleration is applied. FIG. 4 is a diagram showing the acceleration sensor when acceleration is applied. FIG. 5 is a diagram which describes the relationship between the conductive ball 21 and the recess 17. FIG. 6 is a top view of the acceleration sensor of the invention. In FIGS. 3 through 5, m is the mass, g is the acceleration due to gravity, a is the horizontal acceleration to be measured, $F_g$ is the force applied by gravity acceleration, and $F_a$ is the force applied by the acceleration to be measured.

As is seen from FIG. 3, when no acceleration is applied to the acceleration sensor, the conductive ball 21 is on the recess 17, and a force of $F_g=m \cdot g$ is applied thereto. When acceleration is applied to the acceleration sensor, as shown in FIG. 4 a horizontal force of $F_a=m \cdot a$ is applied thereto, so that the conductive ball 21 is moved over the peripheral edge of the recess 17, thus being brought into contact with the first contact 15 so that the switch is turned on.

As is seen from FIG. 5, the condition for causing the conductive ball 21 to move over the edge of the recess 17 may be represented as:

$$\tan \theta < m \cdot a / m \cdot g = a/g \qquad (1)$$

That is, in the embodiment, the operating acceleration is determined by the diameter of the recess 17 formed in the third substrate 13, and by the diameter of the conductive ball 21.

In the case of the above-described first embodiment, as shown in FIG. 6 the through-hole 14 is in the form of a cylinder which is coaxial with the recess, and therefore the distance between the conductive ball 21 and the first contact 15 is constant at all times. Hence, the acceleration sensor is constant in response speed in all directions, thus being non-directional.

Figure 7:
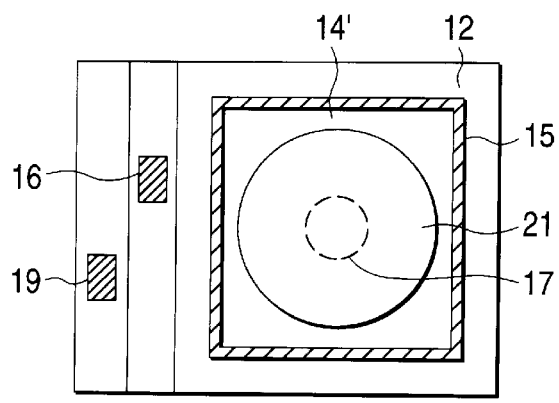
FIG. 7 is a diagram illustrating a second embodiment of the present invention.
Figure 8:
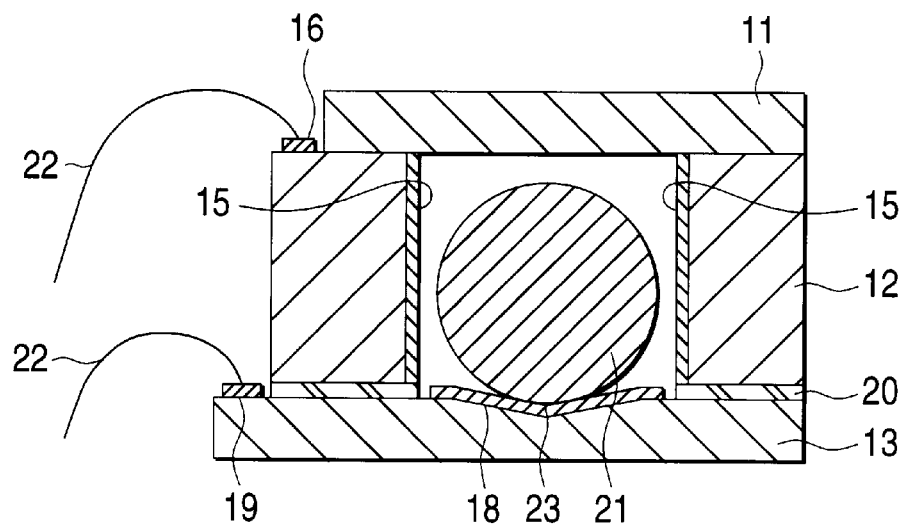
FIG. 8 is a diagram illustrating a third embodiment on the present invention with a recess substantially V-shaped in section (being substantially conical)
Figure 9:
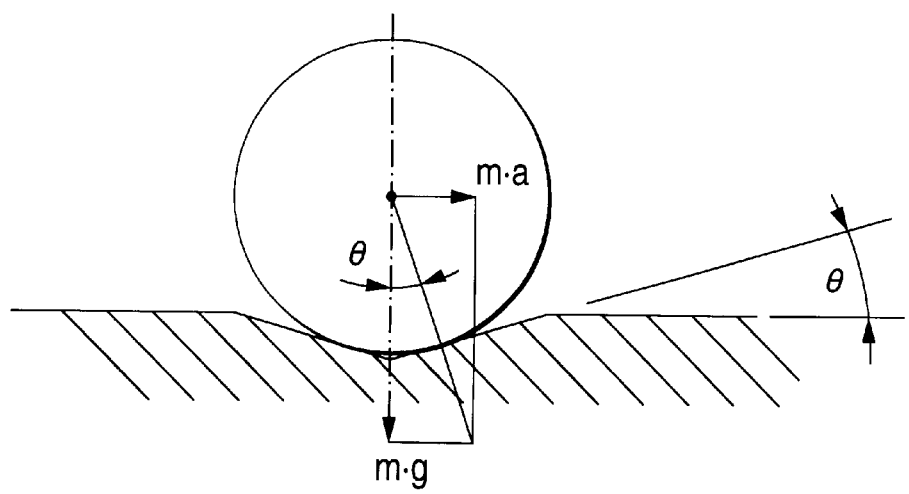
FIG. 9 is a diagram illustrating the relationship between the recess and an electrically conductive ball in the acceleration sensor of FIG. 8.

FIG. 7 is a diagram showing another example of the acceleration sensor wherein the through-hole is rectangular. FIG. 8 is a diagram showing another example of the acceleration sensor wherein the recess 17 is substantially conical in section. FIG. 9 is a diagram for a description of the relationships between the conductive ball 21 and the recess 17.

As is seen from FIG. 7, the second embodiment is different from the first embodiment in the configuration of the through-hole.

The embodiment of FIG. 7 is similar in structure to the first embodiment except that the through-hole 14' is square in section. The acceleration sensor of the second embodiment is non-directional in sensitivity. However, in the case where the conductive ball 21 is moved to any one of the corners, it is directional.

Alternatively, the square through-hole 14' may be modified into a polygonal through-hole.

In the embodiment of FIG. 8, the recess 17 formed in the third substrate 12 is conical as indicated by reference label 23 with an inclination angle of $\theta$. In this case, the condition for causing the conductive ball 21 to move over the conical recess having the climbing angle of $\theta$ is also represented by equation (1).

In the acceleration sensor according to the present invention, the components other than the electrically conductive ball are made of materials which are employed in the semiconductor wafer process. That is, formation of the through-hole, the first contact, the second contact, the bonding pads, and the recess may be achieved using a semiconductor wafer process, thereby resulting in simple component formation, and easy assembling. Further, the acceleration sensor has small size and high accuracy. Accordingly, the acceleration sensor is easily mass-produced to have high reliability and accuracy.

Furthermore, according to the invention, the acceleration sensor can be miniaturized because of the employment of the semiconductor wafer process. Therefore, the resultant acceleration sensor has high performance and high response speed.

It will be apparent to those skilled in the art that various modifications and variations can be made in the acceleration sensor and method for manufacturing thereof of the present invention without departing from the spirit or scope of the invention. Thus, it is intended that the present invention cover the modifications and variations of this invention provided they come within the scope of the appended claims and their equivalents.

What is claimed is:

1. An acceleration sensor for detecting an acceleration, comprising:
    a first substrate;
    a second substrate having a through-hole, a first contact formed on an inner surface of the through-hole, and a first bonding pad connected to the first contact;
    an electrically conductive ball accommodated in the through-hole;
    a third substrate having a recess, a second contact formed in the recess for contacting the bottom of the electrically conductive ball, and a second bonding pad connected to the second contact, the electrically conductive ball forming an electrical connection in the sensor when a magnitude of the acceleration exceeds a threshold acceleration determined by a size and shape of the recess.

2. The acceleration sensor according to claim 1, wherein the through-hole is circular in section.

3. The acceleration sensor according to claim 1, wherein the through-hole is square in section.

4. The acceleration sensor according to claim 1, wherein the recess is substantially U-shaped in section.

5. The acceleration sensor according to claim 1, wherein the recess is substantially V-shaped in section.

6. The acceleration sensor according to claim 5, wherein the recess is substantially conical.

7. The acceleration sensor according to claim 1, wherein the threshold acceleration is defined by $$a_{th} = \frac{r \times g}{\sqrt{R^2 - r^2}}$$

where r is a radius of the recess, R is the radius of the electrically conductive ball, and g is the acceleration due to gravity.

8. The acceleration sensor according to claim 1, wherein threshold acceleration is defined by $a_{th}=g \times \tan \theta$ where the recess includes a surface sloped at an angle $\theta$ with respect to the horizontal and g is the acceleration due to gravity.

9. The acceleration sensor according to claim 1, wherein the second and third substrates include silicon.

10. The acceleration sensor according to claim 1, wherein the electrically conductive ball is solid.

11. The acceleration sensor according to claim 10, wherein the electrically conductive ball includes steel.

12. The acceleration sensor according to claim 11, wherein the electrically conductive ball includes a gold plated surface.

13. A method for manufacturing an acceleration sensor, comprising the steps of:
    forming a through-hole in a first substrate;
    vacuum-evaporating an electrically conductive metal or diffusing high density impurities to form a first contact on the inner surface of the through-hole and a first bonding pad on an upper end face of the first substrate which is connected to the first contact;
    etching a second substrate to form a recess;
    vacuum-evaporating an electrically conductive metal or diffusing high density impurities to form a second contact on the recess and the outer peripheral edge of the recess and to form a second bonding pad connected to the second contact;

attaching one of a top substrate and the second substrate to a first face of the first substrate;

accommodating an electrically conductive ball in the through-hole, a portion of the second contact being in contact with a bottom of the electrically conductive ball accommodated in the through-hole; and attaching the other one of the top and second substrates to a second face of the first substrate.

14. The method according to claim 13, wherein the step of forming the through-hole includes etching.

15. The method according to claim 13, wherein the step of etching includes isotropic etching.

16. The method according to claim 13, wherein the step of etching includes the step of forming a recess with a radius r such that the electrically conductive ball actuates the sensor when an acceleration of the acceleration sensor exceeds a threshold acceleration defined by $$a_{th} = \frac{r \times g}{\sqrt{R^2 - r^2}}$$

where R is a radius of the electrically conductive ball, and g is the acceleration due to gravity.

17. The method according to claim 13, wherein the step of etching includes the step of forming a recess with a surface sloped at an angle θ with respect to the horizontal such that the electrically conductive ball actuates the sensor when an acceleration of the acceleration sensor exceeds a threshold acceleration defined by $a_{th}$=g×tan θ where the recess includes a surface sloped at an angle θ with respect to the horizontal and g is the acceleration due to gravity.

18. The method according to claim 13, wherein the steps of attaching include welding.

* * * * *

UNITED STATES PATENT AND TRADEMARK OFFICE
CERTIFICATE OF CORRECTION

PATENT NO. : 5,987,988
DATED : November 23, 1999
INVENTOR(S) : Takashi KUNIMI et al.

It is certified that error appears in the above-identified patent and that said Letters Patent is hereby corrected as shown below:

Column 6, line 45, change "0" to --θ--.

Signed and Sealed this

Seventeenth Day of April, 2001

Attest:

NICHOLAS P. GODICI

*Attesting Officer*      *Acting Director of the United States Patent and Trademark Office*